(12) United States Patent
Jang et al.

(10) Patent No.: US 9,819,234 B2
(45) Date of Patent: Nov. 14, 2017

(54) METHOD FOR OPERATING VARIABLE MAGNETIC FLUX MOTOR

(71) Applicant: NEW MOTECH CO., LTD., Gwangju (KR)

(72) Inventors: Jeong Cheol Jang, Gwangju (KR); Je Hyung Seo, Gwangju (KR); Woon Pil Jung, Suncheon-si (KR); Jin Seok Jang, Gimje-si (KR); Byung Taek Kim, Gunsan-si (KR)

(73) Assignee: NEW MOTECH CO., LTD., Gwangju (KR)

( * ) Notice: Subject to any disclaimer, the term of this patent is extended or adjusted under 35 U.S.C. 154(b) by 343 days.

(21) Appl. No.: 14/767,293

(22) PCT Filed: Jan. 9, 2014

(86) PCT No.: PCT/KR2014/000220
§ 371 (c)(1),
(2) Date: Aug. 12, 2015

(87) PCT Pub. No.: WO2014/148731
PCT Pub. Date: Sep. 25, 2014

(65) Prior Publication Data
US 2015/0380993 A1  Dec. 31, 2015

(30) Foreign Application Priority Data

Mar. 22, 2013  (KR) .................. 10-2013-0030937

(51) Int. Cl.
*H02K 1/27* (2006.01)
*H02K 1/02* (2006.01)
*H02P 25/024* (2016.01)

(52) U.S. Cl.
CPC ............... *H02K 1/27* (2013.01); *H02K 1/02* (2013.01); *H02K 1/2786* (2013.01); *H02P 25/024* (2016.02)

(58) Field of Classification Search
CPC ........................................................ H02K 1/27
(Continued)

(56) References Cited

U.S. PATENT DOCUMENTS 8,860,356 B2 * 10/2014 Yuuki .................. B60L 15/025
318/432
2012/0330490 A1  12/2012 Ozaki et al.

FOREIGN PATENT DOCUMENTS

JP  2001-258189 A  9/2001
JP  2006-280195 A  10/2006
(Continued)

OTHER PUBLICATIONS

International Search Report for PCT/KR2014/000220 dated Feb. 18, 2014 from Korean Intellectual Property Office.
(Continued)

*Primary Examiner* — David S Luo
(74) *Attorney, Agent, or Firm* — Revolution IP, PLLC

(57) ABSTRACT

Disclosed therein is a method of operating a variable magnetic flux motor. The method of operating the variable magnetic flux motor, which includes a rotor and a stator located inside the rotor, the rotor including first magnets and second magnets having a coercive force weaker than that of the first magnets, includes: a first step of operating the motor in an initially magnetized state of the second magnets; and a second step of operating the motor in an inversedly magnetized state of the second magnets by applying a magnetomotive force to the second magnets in the opposite direction to the magnetization direction of the second magnets.

5 Claims, 6 Drawing Sheets

(58) Field of Classification Search
USPC .................................................. 318/606, 560
See application file for complete search history.

(56) References Cited

FOREIGN PATENT DOCUMENTS

| JP | 2009-112454 A | 5/2009 |
| JP | 2010-148180 A | 7/2010 |
| JP | 2010-226902 A | 10/2010 |
| JP | 2011-188683 A | 9/2011 |
| KR | 10-2007-0058870 A | 6/2007 |
| KR | 10-2010-0080562 A | 7/2010 |
| KR | 10-2011-0009876 A | 1/2011 |

OTHER PUBLICATIONS

Lim et al., "Permanent Magnet Demagnetization Characteristics Analysis of a Variable Flux Memory Motor Using Coupled Preisach Modeling and FEM", 2007 IEEE International Electric Machines &Drives Conference, Jul. 18-20, 2007.

Kim et al.,"Re-Demagnetization Operation Characteristics Analysis of a Variable Flux Memory Motor Using Coupled Preisach Modeling and FEM", 2004 IEEE International Electric Machines &Drives Conference, Jul. 14-26, 2004.

* cited by examiner

[Fig. 1]
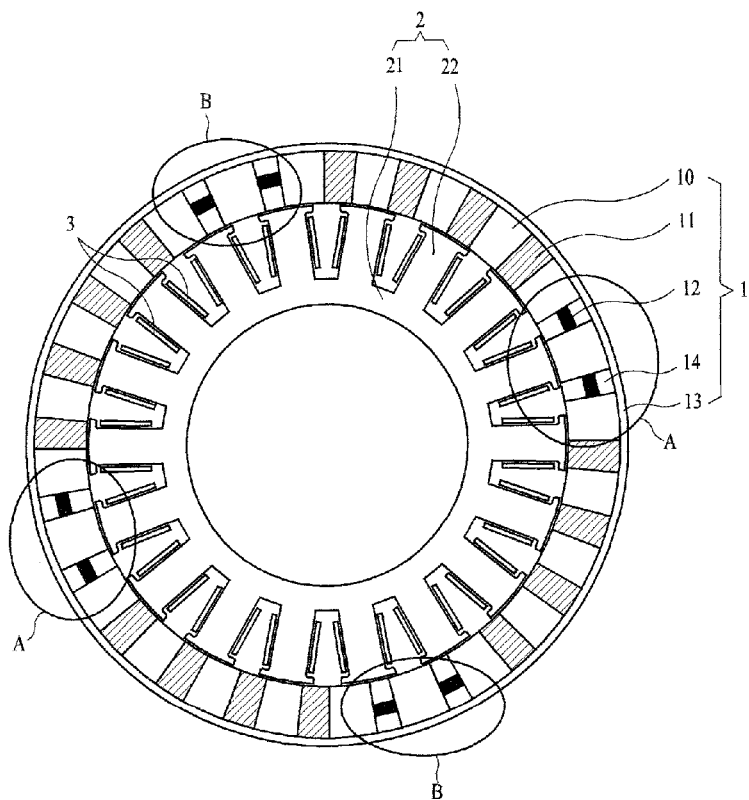
[Fig. 2]
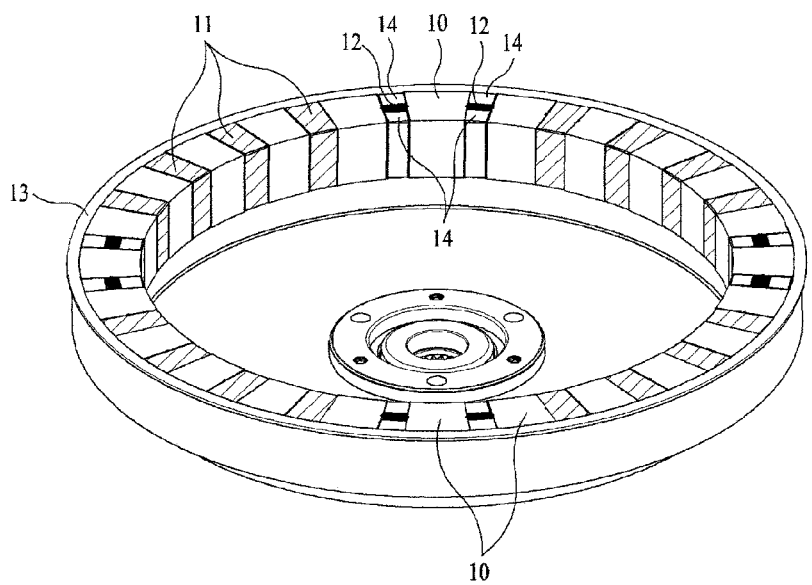

[Fig. 3]
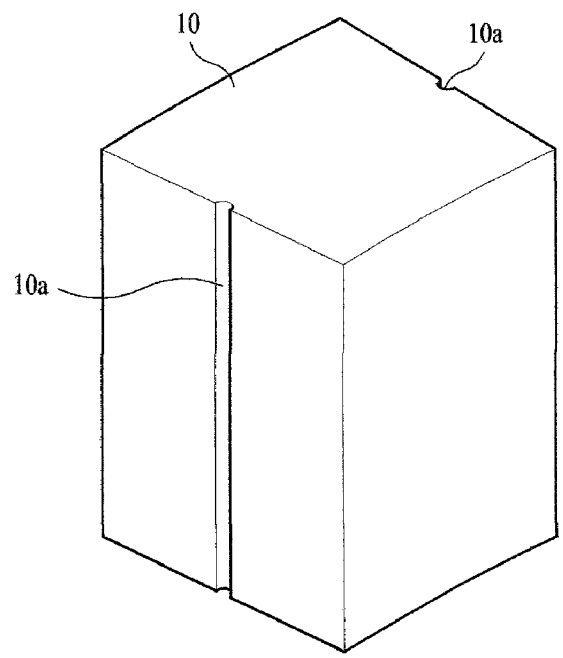
[Fig. 4]
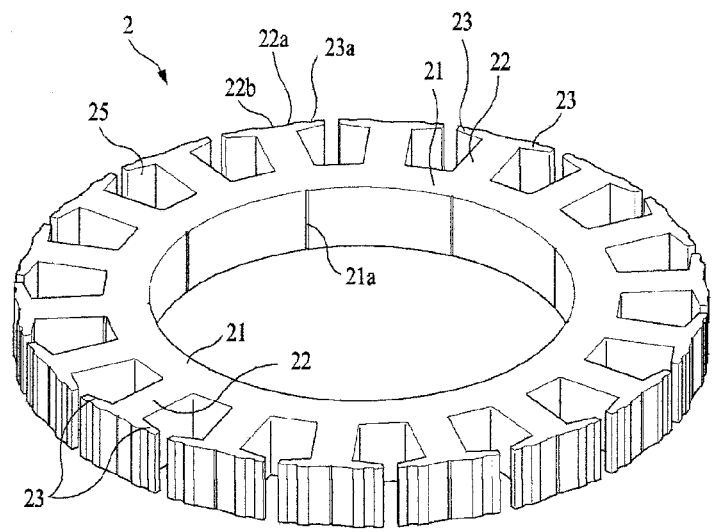

[Fig. 5]
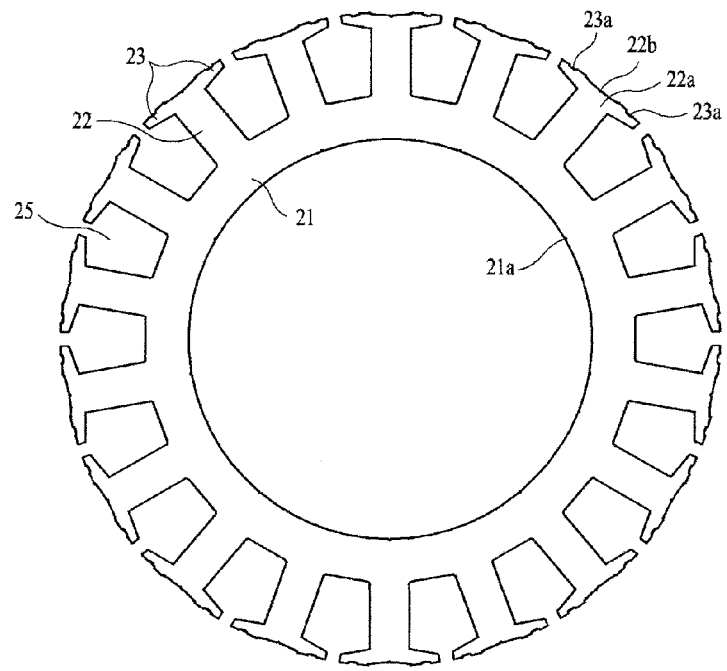
[Fig. 6]
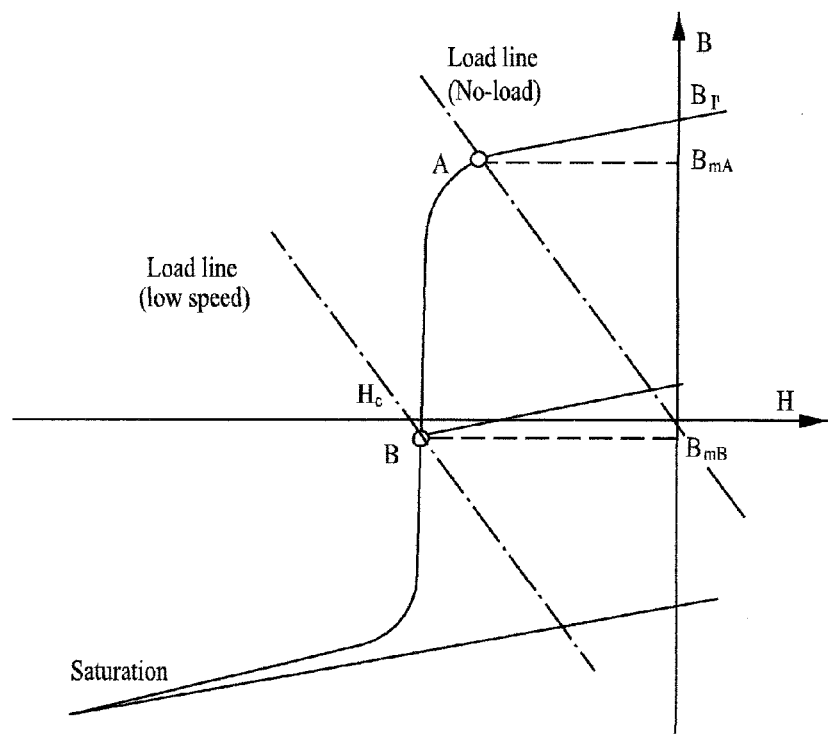

[Fig. 7]
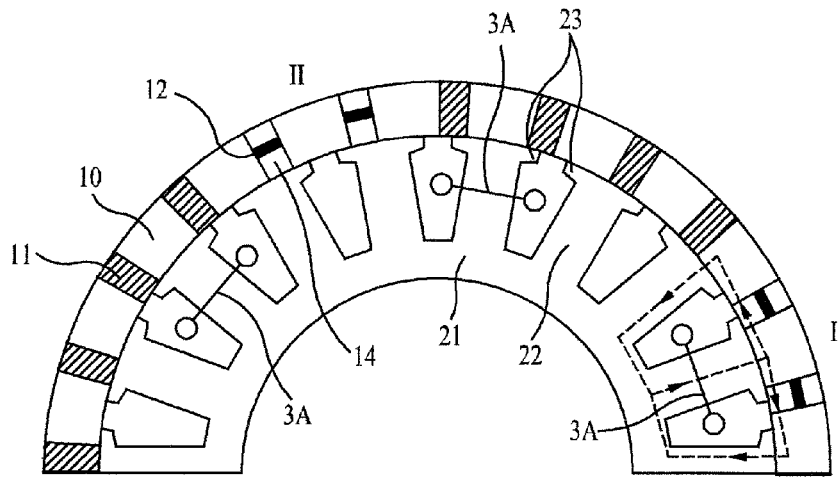
[Fig. 8]
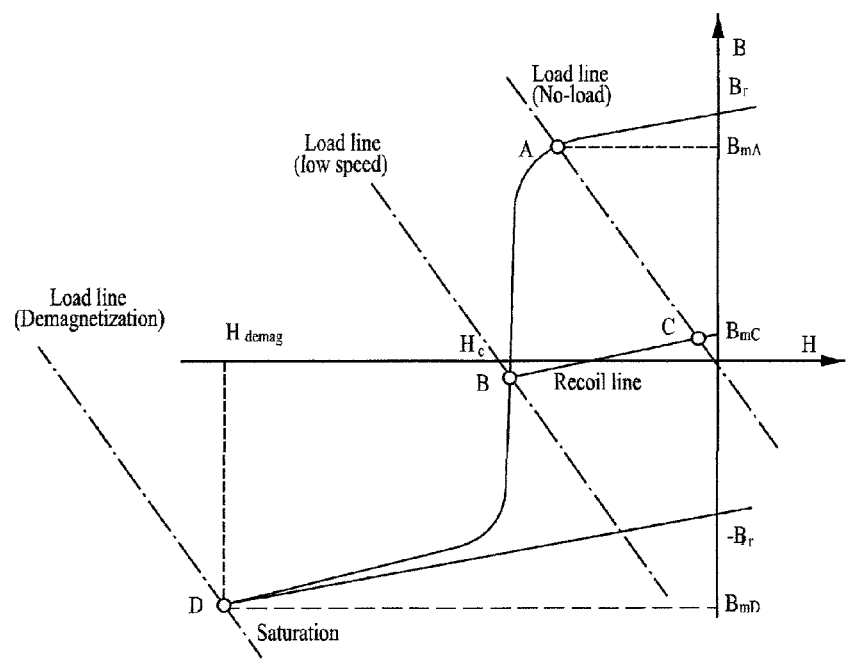

[Fig. 9]
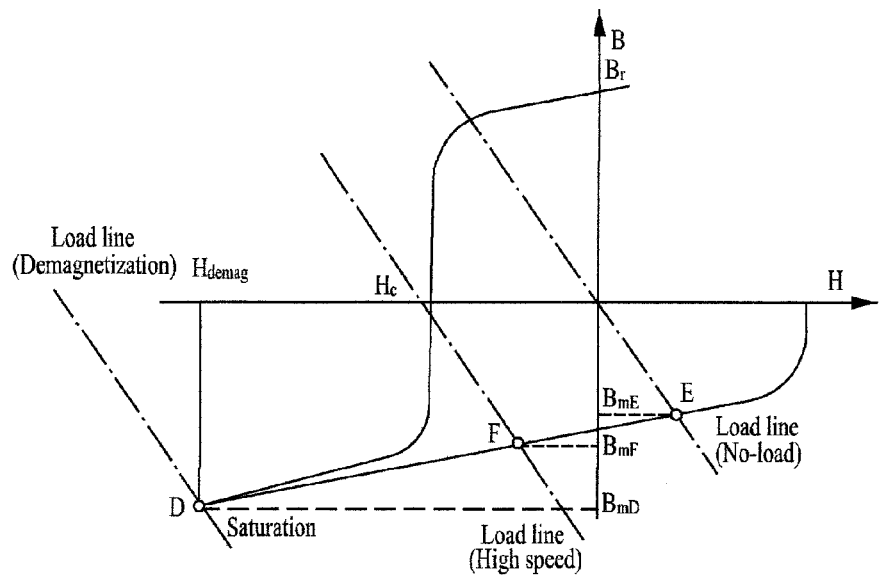
[Fig. 10]
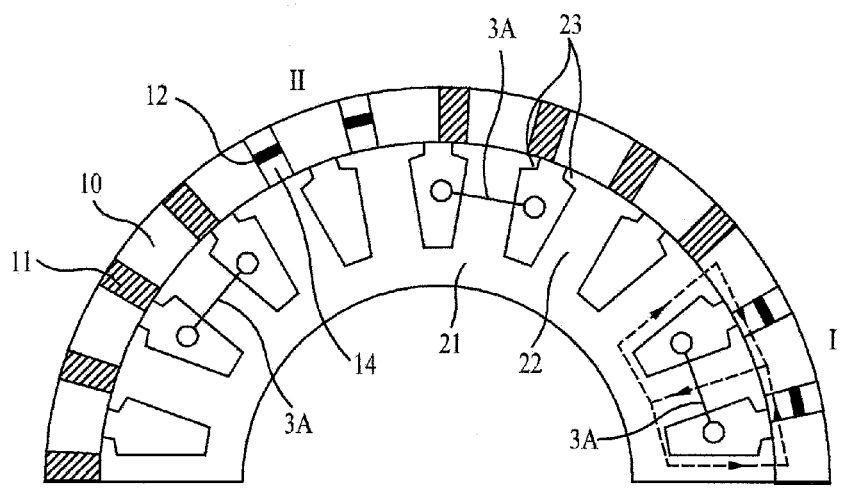

[Fig. 11]
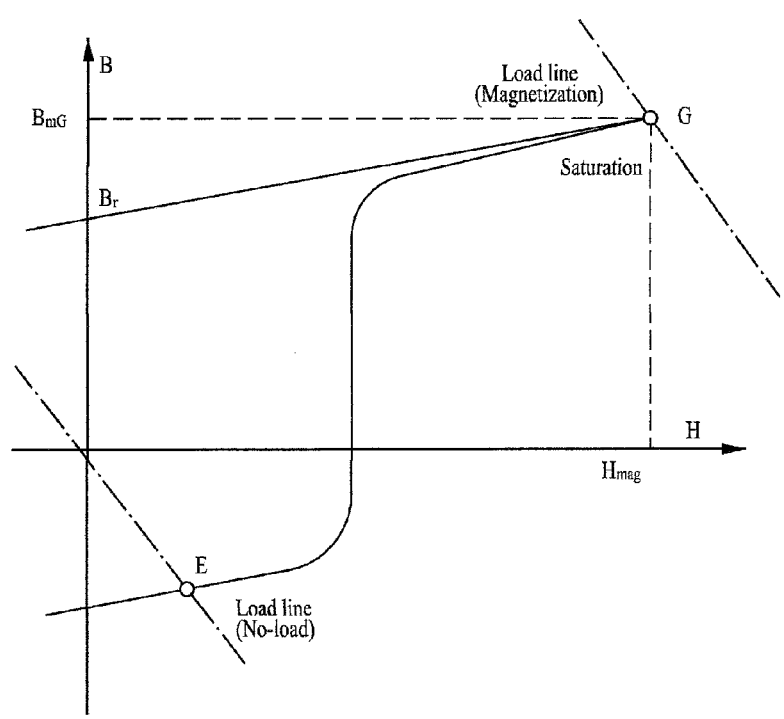

METHOD FOR OPERATING VARIABLE MAGNETIC FLUX MOTOR

CROSS REFERENCE TO PRIOR APPLICATIONS

This application is a National Stage Application of PCT International Patent Application No. PCT/KR2014/000220 filed on Jan. 9, 2014, under 35 U.S.C. §371, which claims priority to Korean Patent Application No. 10-2013-0030937 filed on Mar. 22, 2013, which are all hereby incorporated by reference in their entirety.

TECHNICAL FIELD

The present invention relates to a motor. More particularly, the present invention relates to a new structure of a motor, which can be operated at a variable speed by demagnetizing or magnetizing some of magnets applied to a rotor and can obtain high efficiency by concentrating an amount of magnetic flux.

BACKGROUND ART

In general, in order to simultaneously obtain a variable speed operation and high efficiency of a motor, various structures and forms of motors have been proposed. Representatively, there are a variable flux memory motor (VFMM) (hereinafter, called "prior art 1") and a motor disclosed in Japanese Patent Laid-open No. 2009-112454 (hereinafter, called "prior art 2").

A rotor of the variable flux memory motor according to the prior art 1 is basically similar with a brushless DC electric motor (BLDC motor) of a spoke type. The motor is a motor that permanent magnets are demagnetized from a narrower part thereof due to a difference in thickness of the permanent magnets when a negative d-axis current flows to a d-axis which is a magnetic flux generation axis of a stator. The motor is operated at a variable speed by demagnetizing and magnetizing the permanent magnets based on the above principle.

The motor according to the prior art 2 is basically similar with an outer-rotor type BLDC motor of a salient pole concentrated winding structure. The motor is characterized in that two kinds of magnets with different coercive forces are embedded in a rotor core in such a way as to be arranged in a circumferential direction in turn to thereby form opposite poles. That is, the rotor core has holes for embedding first magnets and second magnets therein and protrusions formed on an inner face of the rotor core. Accordingly, the motor according to the prior art 2 has several problems in that the rotor core is complicated in structure and manufacturing costs are increased.

In the meantime, the motor according to the prior art 2 includes the first magnets and the second magnets having lower coercive force than the first magnets and is operated in such a way as to increase the magnetic flux of the entire magnets at the time of the laundry process by magnetizing the second magnets but to decrease the magnetic flux of the magnets at the time of the dewatering process more than the laundry process by demagnetizing the second magnets. However, in the case that the coercive force of the second magnets is relatively much lower, in other words, in the case that an increased amount of the entire magnetic flux is almost negligible even though the second magnets are magnetized and operated, in terms of effectiveness in operation, it is advantageous to use the magnetic flux of the first magnets rather than to magnetize the second magnets at the time of the laundry process and to offset the entire magnetic flux by inversedly magnetizing the second magnets at the time of the dewatering process.

Therefore, the inventors of the present invention propose a variable magnetic flux motor using the above-mentioned method.

DISCLOSURE OF INVENTION

Technical Problem

Accordingly, the present invention has been made in an effort to solve the above-mentioned problems occurring in the prior arts, and it is an object of the present invention to provide a variable magnetic flux motor of a new structure.

It is another object of the present invention to provide a variable magnetic flux motor which is operated by a new method.

The above and other objects, features and advantages of the present invention will be apparent from the following detailed description of the preferred embodiments of the invention in conjunction with the accompanying drawings.

Solution to Problem

To achieve the above objects, the present invention provides a method of operating a variable magnetic flux motor, which includes a rotor and a stator located inside the rotor, the rotor including first magnets and second magnets having a coercive force weaker than that of the first magnets, the method including: a first step of operating the motor in an initially magnetized state of the second magnets; and a second step of operating the motor in an inversedly magnetized state of the second magnets by applying a magnetomotive force to the second magnets in the opposite direction to the magnetization direction of the second magnets.

After the second step, the method of operating the variable magnetic flux motor further includes a third step of operating the motor in a re-magnetized state of the second magnets by applying a magnetomotive force to the second magnets in the same direction as the magnetization of the second magnets.

In the preferred embodiment of the present invention, the first magnets are neodymium magnets and the second magnets are alnico magnets.

Moreover, the second magnets are constituted of magnets located at both sides of a pair of opposed unit rotor cores and magnets located at both sides of a pair of unit rotor cores where a connection line for connecting the two opposed unit rotor cores with each other and a perpendicular line meet together. Additionally, the first magnets are the remaining magnets except the second magnets, and the second magnets occupy just a part of a space formed between two unit rotor cores.

Furthermore, the space formed between the neighboring unit rotor cores of the second magnet except the space occupied by the second magnets is filled with a spacer.

Advantageous Effects of Invention

According to the exemplary embodiment of the present invention, the variable magnetic flux motor of the new structure and the method for operating the same can reduce manufacturing costs and cause a high performance enhancement because the variable magnetic flux motor is favorable to concentration of the amount of magnetic flux.

BRIEF DESCRIPTION OF DRAWINGS

FIG. 1 is a plan view of a structure of a rotor of a variable magnetic flux motor according to the present invention.

FIG. 2 is a perspective view of a rotor structure of the variable magnetic flux motor according to the present invention.

FIG. 3 is a perspective view of a unit rotor core used in the rotor of the variable magnetic flux motor.

FIG. 4 is a perspective view of a stator of the variable magnetic flux motor.

FIG. 5 is a plan view of the stator of the variable magnetic flux motor.

FIG. 6 is a graph showing a B-H curve for explaining an operating point of a second magnet when the variable magnetic flux motor is operated at low speed.

FIG. 7 is a conceptual view for showing an inversed magnetization process of the variable magnetic flux motor.

FIG. 8 is a graph showing a B-H curve for explaining an operating point of the second magnet when the variable magnetic flux motor is inversedly magnetized.

FIG. 9 is a graph showing a B-H curve for explaining an operating point of the second magnet when the variable magnetic flux motor is operated at high speed.

FIG. 10 is a conceptual view for showing a re-magnetization process of the variable magnetic flux motor.

FIG. 11 is a graph showing a B-H curve for explaining an operating point of the second magnet when the variable magnetic flux motor is re-magnetized.

Hereinafter, reference will be now made in detail to the preferred embodiment of the present invention with reference to the attached drawings.

MODE FOR THE INVENTION

FIG. 1 is a plan view of a structure of a variable magnetic flux motor according to the present invention, and FIG. 2 is a perspective view of a structure of a rotor of a variable magnetic flux motor according to the present invention.

As shown in FIG. 1, the variable magnetic flux motor according to the present invention includes a rotor 1 and a stator 2.

The rotor 1 includes a plurality of unit rotor cores 10, first magnets 11, second magnets 12 and spacers 14, which are located on the outer circumferential surface of the stator 2. As shown in FIG. 2, the spacers 14 which surround the unit rotor cores 10, the first magnets 11 and the second magnets 12 are located on the inside wall surface of an outer case 15 which is located on the inside wall surface of a rotor housing 13.

In the present invention, the stator 2 includes a stator core base 21 and a plurality of teeth 22 radially formed on the outer peripheral surface of the stator core base 21.

A coil 3 is wound on the teeth 22 of the stator 2, and occupies some space in a slot formed between two neighboring teeth 22.

As shown in FIGS. 1 and 2, the variable magnetic flux motor according to the present invention adopts a type of 24 poles-18 slots, but the present invention is not limited to the above, and on occasion demands, the number of poles and slots may be varied.

In the case of the motor with 24 poles-18 slots, as shown in FIG. 1, twenty-four unit rotor cores 10 and twenty-four magnets 11 and 12 are located in turn. Out of the twenty-four magnets, sixteen magnets are the first magnets 11 and eight magnets are the second magnets 12. That is, the motor according to the preferred embodiment of the present invention has a structure that two second magnets 12 are mounted at one side of an array of four first magnets 11. As shown in FIG. 1, the unit rotor core 10 is located between the neighboring magnets, and the second magnets 12 are arranged in the direction of 12 o'clock, 3 o'clock, 6 o'clock, and 9 o'clock by two. In other words, the second magnets are mounted at both sides of the unit rotor core which is opposed to the unit rotor core 10 located between the neighboring second magnets 12 (see the A part of FIG. 1), and the other two second magnets are mounted at both sides of two unit rotor cores where a connection line for connecting the two opposed unit rotor cores and a perpendicular line meet each other (see the B part of FIG. 1). Accordingly, total eight second magnets are applied.

The spacer 14 is located in the inner diameter direction and in the outer diameter direction of the second magnet 12. The first magnet 11 occupies the entire space between the neighboring unit rotor cores 10, but the second magnet 12 occupies a part of the space between the neighboring unit rotor cores 10 and the spacer 14 occupies the remaining space. The spacer 14 is made of an insulation material, preferably, an insulating plastic resin. More preferably, the spacer 14 is manufactured by plastic resin molding integrated with the outer case 15. Meanwhile, as shown in FIGS. 1 and 2, it is preferable that both ends of the second magnet 12 have the width crossing the space formed between the neighboring unit rotor cores 10 getting in contact with each other.

The outer case 15 is formed to be in contact with the outer circumferential surface of a circle formed by the unit rotor cores 10, the first magnets 11 and the spacers 14 and is located on the inner face of the rotor housing 13. Preferably, the outer case 15 is made of an insulating plastic material. The outer case 15 is not necessarily applied and may be omitted if necessary.

In the present invention, the first magnets 11 are neodymium magnets, and the second magnets 12 are alnico magnets. Rotational characteristics of the motor can be regulated through a difference in coercive force between the first and second magnets of the two kinds. That is, an amount of magnetic flux of the second magnets 12 can be regulated using magnetization current and demagnetization current so as to control output, torques, and characteristics of RPM of the motor as occasion demands.

FIG. 3 is a perspective view of the unit rotor core 10 used in the rotor 1 of the variable magnetic flux motor.

As shown in FIG. 3, the unit rotor core 10 according to the present invention has a structure that the magnets can be attached to both sides thereof, and a plurality of the magnets and a plurality of the unit rotor cores 10 are repeatedly attached so as to generally form a circular shape. In order to be attached to the neighboring magnet, the unit rotor core 10 may have weld lines 10a formed at both sides thereof. The magnet and the unit rotor core can be combined by laser welding along the wed lines 10a. Of course, the attachment method is not limited to the laser welding, and may be adopted from various attachment methods. For instance, caulking or other welding methods may be applied.

FIG. 4 is a perspective view of the stator 2 of the variable magnetic flux motor, and FIG. 5 is a plan view of the stator 2 of the variable magnetic flux motor.

As shown in FIGS. 4 and 5, the stator 2 according to the present invention includes the circular stator core base 21 and the teeth 22 radially arranged on the outer circumferential surface of the stator core base 21 at equal intervals. Each of the teeth 22 has ears 23 formed at both sides of an end thereof. The stator 2 is formed by core steel sheets laminated repeatedly. The stator core base 21 has a plurality of base welding slots 21a formed on the inner circumferential surface thereof, and laser welding is carried out along the base welding slots 21a so as to firmly fix a plurality of the core steel sheets. Of course, besides the laser welding, caulking or other welding method may be applied.

The space formed between the two neighboring teeth 22 forms a slot 25. The coil is wound on the teeth 22. In order to electrically insulate between the teeth 22 and the coil 3, an insulator (not shown) may surround the teeth 22 before the coil is wound on the teeth 22. Each of the teeth 22 has a tooth recess 22a inwardly hollowed a little and formed on the outer peripheral surface of the end portion thereof, and each of the ears 23 formed at both sides of the end of the tooth 22 also has an ear recess 23a inwardly hollowed a little similarly with the tooth recess 22a. The tooth recess 22a and the ear recess 23a serve to reduce a cogging torque which can concentrically generate the amount of magnetic flux.

The tooth recess 22a has a tooth welding slot 22b, and the tooth welding slot 22b serves to combine the stator core sheets together through one of various welding methods like the base welding slots 21a which are described previously.

FIG. 6 is a graph showing a B-H curve for explaining an operating point of a second magnet when the variable magnetic flux motor is operated at low speed.

The variable magnetic flux motor according to the preferred embodiment of the present invention can be operated in two stroke cycles by varying the magnetic flux. In other words, the variable magnetic flux motor can be operated in a first stroke which is a low speed and high torque operation and in a second stroke which is a high speed and low torque operation.

FIG. 6 illustrates the B-H curve of the alnico magnets, which are the second magnets 12 of the variable magnetic flux motor according to the preferred embodiment of the present invention. In case of washing machines, the low speed operation which is the first stroke is applied when the motor is rotated at low speed and needs high torque like the washing process. At the time of no-load operation, the alnico magnets by magnetic circuits around the magnets are operated at an intersection point A where the B-H curve and a load line meet together. The load line of the alnico magnets moves in the H direction by 3-phase current at the time of the low speed operation. The motor operates at an intersection point B where the third quadrant of the B-H curve of the alnico magnets and the load line meet together. Therefore, because the amount of magnetic flux generated from the alnico magnets which are the second magnets is very small at the time of the low-speed operation, the general operation of the motor, namely, the rotation of the rotor is achieved by the neodymium magnets which are the first magnets.

FIG. 7 is a conceptual view for showing an inversed magnetization process of the variable magnetic flux motor, and FIG. 8 is a graph showing a B-H curve for explaining an operating point of the second magnet when the variable magnetic flux motor is inversedly magnetized.

Referring to FIGS. 7 and 8, the variable magnetic flux motor according to the preferred embodiment of the present invention is operated at an operating point C at the time of no-load along a recoil line after finishing the operation at the intersection point B where the third quadrant of the B-H curve of FIG. 8 and the load line meet together. In this instance, after the rotor cores 10 located at I of FIG. 7 are arranged at the position of a phase A on which an A-phase coil 3A is wound, a magnetomotive force is applied in the opposite direction to the magnetization direction of the second magnets 12 in order to inversely magnetize the second magnet 12 which is located at the position I. Next, the rotor cores 10 located at a position II are arranged at the position of the phase A, and then, likewise, a magnetomotive force is applied in the opposite direction to the magnetization direction of the second magnets 12 in order to inversedly magnetize the second magnets 12 which are located at the position II. In this instance, at the time of the inversed magnetization, the magnetization current of the inversed direction flows to a saturation point D of the second magnets 12 illustrated in FIG. 8 so as to inversely magnetize the second magnets. Hereinafter, the operational principle at the time of the high-speed operation which is the second stroke using the second magnets 12 inversedly magnetized will be described.

FIG. 9 is a graph showing a B-H curve for explaining an operating point of the second magnet when the variable magnetic flux motor is operated at high speed.

As shown in FIG. 9, the second magnets 12 inversedly magnetized are operated at a point E at the time of no-load. The road line of the second magnets is moved in the H direction by the 3-phase current at the time of the high-speed operation. Because the motor operates at an intersection point F where the B-H curve of the second magnets and the load line meet together at the time of the high speed operation, the entire amount of magnetic flux is decreased.

FIG. 10 is a conceptual view for showing a re-magnetization process of the variable magnetic flux motor, and FIG. 11 is a graph showing a B-H curve for explaining an operating point of the second magnet when the variable magnetic flux motor is remagnetized.

After the high speed operation which is the second stroke, the second magnets 12 at the time of no-load are operated at the intersection point E where the fourth quadrant of the B-H curve and the road line meet together in the graph of FIG. 11. In this instance, in order to change from the second stroke to the first stroke, the rotor cores 10 located at the position I in FIG. 10 are arranged at the position of the phase A on which the A-phase coil 3A is wound, and then, a magnetomotive force is applied in the same direction as the magnetization of the second magnets 12 in order to re-magnetize the second magnet 12 which is located at the position I. Next, the rotor cores 10 located at a position II is arranged at the position of the phase A, and then, likewise, a magnetomotive force is applied in the same direction as the magnetization of the second magnets 12 in order to re-magnetize the second magnets 12 which are located at the position II. Here, the magnetization current of the forward direction flows to a saturation point G of the second magnets 12 illustrated in FIG. 10 so as to re-magnetize the second magnets. When the second magnets 12 are re-magnetized, the motor becomes in a state capable of being operated at low speed and high torque.

While the present invention has been particularly shown and described with reference to the preferred embodiment thereof, it will be understood by those of ordinary skill in the art that the present invention is not limited to the above embodiment and various changes or modifications may be made therein without departing from the technical idea of the present invention.

The invention claimed is:

1. A method of operating a variable magnetic flux motor which includes a rotor and a stator located inside the rotor, the rotor including first magnets and second magnets having a coercive force weaker than that of the first magnets, the method comprising:

a first step of operating the motor in an initially magnetized state of the second magnets; and a second step of operating the motor in an inversedly magnetized state of the second magnets by applying a magnetomotive force to the second magnets in the opposite direction to the magnetization direction of the second magnets.

2. The method according to claim 1, further comprising:

a third step of operating the motor in a re-magnetized state of the second magnets by applying a magnetomotive force to the second magnets in the same direction as the magnetization of the second magnets, after the second step.

3. The method according to claim 2, wherein the first magnets are neodymium magnets and the second magnets are alnico magnets.

4. The method according to claim 2, wherein the second magnets are constituted of magnets located at both sides of a pair of opposed unit rotor cores and magnets located at both sides of a pair of unit rotor cores where a connection line for connecting the two opposed unit rotor cores with each other and a perpendicular line meet together, and wherein the first magnets are the remaining magnets except the second magnets, and the second magnets occupy just a part of a space formed between two unit rotor cores.

5. The method according to claim 4, wherein the space formed between the neighboring unit rotor cores of the second magnet except the space occupied by the second magnets is filled with a spacer.

* * * * *